Oct. 24, 1967 M. MULLER ETAL 3,349,337
FREQUENCY SYNCHRONIZING CIRCUIT
Filed May 16, 1966
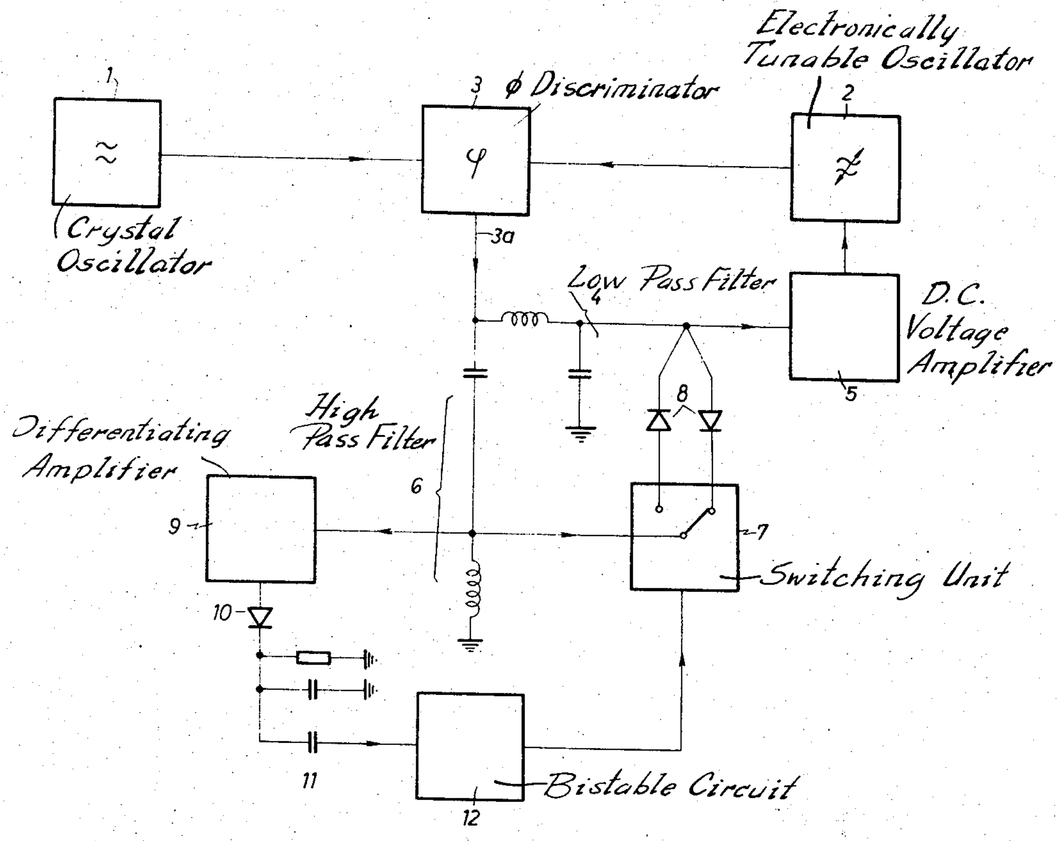

3,349,337

FREQUENCY SYNCHRONIZING CIRCUIT

Martin Müller and Gerhard Walter, Pforzheim, Germany, assignors to International Standard Electric Corporation
Filed May 16, 1966, Ser. No. 550,552
Claims priority, application Germany, May 21, 1965, St 23,862
4 Claims. (Cl. 331—17)

ABSTRACT OF THE DISCLOSURE

A circuit for automatically synchronizing the frequency of an electronically tuned circuit to the frequency of a crystal controlled oscillator. The circuitry utilizes a phase discriminator to obtain a retuning voltage. The retuning voltage is polarity biased by an arrangement which reverses the bias polarity whenever $\Delta f$ between the control and controlled frequencies increases.

This invention is related to oscillators and more particularly to circuit arrangements for automatically locking or synchronizing the frequency of electronically tuned oscillators to the frequency of a crystal controlled oscillator. Phase synchronization is one means for controlling the frequency of an oscillator. Phase synchronization is advantageous over other types of frequency control methods because this type of synchronization, on the average throughout long periods of time, safeguards an absolute frequency equality between the oscillator to be regulated and a normal frequency. This type of frequency stabilization has long been used in the measuring instrument field.

Phase synchronization is accomplished by comparing the frequency of the oscillator to be regulated (controlled) with that of a normal oscillator in a phase discriminator. A control voltage is obtained from the phase difference between both oscillators. The control voltage is used to adjust the oscillator frequency. In order to initiate this control process, it is necessary that the two oscillators are "locked" to one another. There will then be obtained a more or less wide frequency range over which the oscillator frequency can be controlled (holding range). In the case of measuring instruments, this process of "locking in" the two frequencies is carried out manually, and the locked condition is indicated by either a zero instrument or a visual indicator.

Considering the continuously increasing demands which are placed on the frequency accuracy of communications equipments, the phase synchonization is also being introduced to apparatus in the communications art. This is the case all the more since semiconductor elements are used for producing the desired frequency with the aid of multiplication, so that small frequency errors are multiplied. With respect to communications equipments, the manual "locking," as is customary with measuring instruments, would only be possible if the equipments were operated in manned stations because it must be continuously expected that the oscillator jumps out of the hold range owing to such exigencies as momentary main failures or other disturbing influences.

Moreover, in trying to find a solution to this problem it is known to have the locking performed automatically with the aid of a search generator. This generator, which is automatically switched on when a locking is missed causes the oscillator to be "swept" through a predetermined "search range." This search range is chosen to be twice as wide as the frequency is expected to drift or deviate from the rated value on account of temperature and aging influences. After the locking is effected, the search generator is automatically switched off.

In this conventional type of arrangement, however, there is a probability of 0.5 that during the first halfware of the search generator, the frequency of the oscillator to be locked, will be detuned in the wrong direction. Thus, from a "natural" frequency drift, that is a deviation by $\Delta f$, there may be a difference between the search generator frequency and the oscillator frequency which is equal to or greater than $3\Delta f$. In cases where the oscillator departs from the hold range owing to aging, the search generator will remain continuously in its on state, sweeping the oscillator continuously throughout a large frequency range which then, under certain circumstances, may be far outside the range of the rated frequency. This constant searching might have an extremely disturbing effect.

Further, it is known in the case of retuning the frequency of a tunable oscillator by locking its oscillator frequency to one of the upper harmonics of a quartz spectrum, and for the purpose of effecting a stronger deflection of the tunable oscillator, to alternately superimpose a positive and a negative surge upon the frequency control voltage in the rhythm of an automatic interruption. However, even that search circuit has the disadvantage that the oscillator itself must be returned by hand.

An object of the invention is to overcome the above described deficiencies; thus providing a substantially wider field of practical application for phase synchronization. The invention is based on the knowledge that the phase discriminator, in the non-locked case, produces an AC voltage whose amplitude is constant, and whose frequency increases as a direct function of the frequency drift $\Delta f$ of the oscillator to be controlled from the normal frequency. According to the present invention, a polarity criterion is obtained by rectifying the AC voltage obtained from a phase comparator. The A.C. voltage serves as a revertive control voltage having a retuning effect. The polarity changes as a function of the frequency variation of the AC voltage caused by the retuning voltage.

According to a further embodiment of the invention there is provided a bistable circuit stage controlling the polarity of the retuning voltage, which is only reversed or switched over by the action of a positive pulse resulting from an increasing frequency deviation of the tuning oscillator from the quartz (crystal) oscillator.

Another possibility for obtaining the direction criterion is to be seen, in accordance with a further embodiment of the invention, in a circuit arrangement storing the last DC voltage condition at the output of the phase discriminator and, correspondingly, polarizing the revertive control voltage.

These and other features of this invention and the manner of obtaining them will become more apparent, and the invention itself will be best understood by reference to the following description of an embodiment of the invention taken in conjunction with the accompanying drawing, in which:

The invention will now be explained in detail with reference to drawing.

Reference numeral 1 indicates the source of normal frequency such as a crystal controlled oscillator. The frequency of the electronically tunable oscillator 2 is controlled by comparison with normal frequency. Reference numeral 3 indicates the phase discriminator with its output in a phase discriminator 3*a*. The reference numeral 4 indicates a low-pass filter, and 5 indicates a DC voltage amplifier which, in the case of a sufficient slope (volts per radian) of the discriminator 3 may also be omitted. Up to this there is involved the conventional type of circuit. If the oscillator 2 were to be tuned to the normal frequency, even momentarily then it would be "locked" by the control circuit and, with a certain phase difference which is necessary for producing the control voltage, would be "kept" or retained at the normal frequency.

The novel features of the inventive type of circuit arrangement commences with the high-pass filter 6. It is assumed that the two oscillators 1 and 2 are not locked to one another, but have a frequency difference of $\Delta f$. In this case, an alternating voltage, with the frequency $\Delta f$, and with an amplitude corresponding to the maximum phase drift will appear at the output 3_a_ of the discriminator 3. The same AC voltage also appears across the inductance of the highpass filter 6 and is applied via the e.g. electronic switching unit 7, to one of the rectifiers 8 where it is rectified and applied to the input of the DC voltage amplifier 5. The output of this amplifier now serves to detune the oscillator 2.

Assuming first the reversing switch 7 being in the proper position, the oscillator 2 will be detuned in the direction of the normal frequency. In the course of this, and after a period of time which is determined by the various time constants involved, it crosses the normal frequency and locks. The AC voltage disappears and, consequently, also the search voltage which arrives over the path 6, 7, 8 is eliminated. The desired control voltage is built up over the path 3_a_, 4, and the locking process is completed.

Assuming now the reversing switch 7 is in the "wrong" position, and the probability for this is again equal to 0.5, then notice will have to be taken of the parallel connected differentiating amplifier 9. This may consist, e.g. of a transistor with an inductance serving as the operating resistance. In the presence of the difference frequency $\Delta f$, a certain voltage proportional to $\Delta f$, will appear at this operating resistance, and will be rectified at the diode 10. As the frequency $\Delta f$ changes, a voltage variation will appear at the capacitance 11 of the output circuit 9 is positive. The polarity of the voltage output of the differentiating amplifier 9 will go to the negative if $\Delta f$ becomes smaller and, into the positive if $\Delta f$ becomes higher. The diode 10 passes only the positive output of the differentiating amplifier. This pulse output of capacitor 11 is applied to the input of the bistable circuit 12. This bistable circuit is assumed to be polarized in such a way as to be reversed by a positive pulse. The output of this bistable circuit 12 is assumed to control the switch 7 so that whenever the bistable circuit 12 reverses the electronic switching unit 12 switches.

In the case of an accidentally wrong polarization of the switch 7, the "search voltage" of the oscillator 2, as coming via 6, 7, 8 detunes the oscillator in the direction towards the higher $\Delta f$. Therefore, there is initiated via circuits 9, 10, 11 the reversal of 12 and, consequently, of the switch 7. By correspondingly selecting the time constants and the operating thresholds, care must be taken that the chance of detuning in the wrong direction is kept small. Subsequently to the switchover process, the locking process is the same as described hereinbefore.

A further inventive solution would be to replace the circuits 9, 10, 11 and 12 by a trigger controlled by the control voltage, acting as a kind of "memory" of the DC voltage condition prior to the dropping of the oscillator out of synchronization. This circuit is somewhat simpler, but requires that the locking has to be carried out once by hand.

While the principles of the invention have been described above in connection with the specific apparatus and applications, it is to be understood that this description is made by way of example and not as a limitation on the scope of the invention.

We claim:

1. A circuit arrangement for locking the frequency of a controlled oscillator to the frequency of a control oscillator by using a phase discriminator to compare the controlled frequency to the control frequency and to provide an AC signal when said control frequency and said controlled frequency are not matched, said arrangement comprising filter means for providing oscillator tuning control signals responsive to an output from said discriminator, said filter means comprising a low pass filter to provide a signal for keeping said controlled oscillator locked in with said control frequency and a high pass filter to provide a signal for locking said controlled frequency to said control frequency, and switch means for coupling the output of said high pass filter to control said controlled oscillator.

2. The circuit arrangement of claim 1 wherein said switch means has a proper position for returning said controlled oscillator to produce said control frequency and a wrong position, for detuning said controlled oscillator means for controlling said switch means responsive to the output of said high pass filter to switch said switch means to said proper position.

3. The circuit arrangement of claim 2 wherein said means for controlling said switch means comprises a differentiating amplifier coupled to the output of said high pass filter, said differentiating amplifier means providing a positive output if the said frequency difference is becoming larger, and bistable circuit means operated responsive to said positive output from said differentiating amplifier means for causing said switching means to switch over.

4. The circuit arrangement of claim 3 wherein a DC voltage amplifier is coupled between said filter means and said oscillator.

No references cited.

ROY LAKE, *Primary Examiner.*

JOHN KOMINSKI, *Examiner.*